Sept. 29, 1959    W. C. STARNES ET AL    2,906,798
HYDROISOMERIZATION PROCESS AND APPARATUS
Filed Aug. 28, 1957

INVENTORS
WILLIAM C. STARNES
ROBERT C. ZABOR
BY
THEIR ATTORNEY

United States Patent Office 2,906,798
Patented Sept. 29, 1959

2,906,798

HYDROISOMERIZATION PROCESS AND APPARATUS

William C. Starnes, Winfield Township, Butler County, and Robert C. Zabor, Glenshaw, Pa., assignors to Gulf Research & Development Company, Pittsburgh, Pa., a corporation of Delaware Application August 28, 1957, Serial No. 680,825

4 Claims. (Cl. 260—683.65)

This invention relates to a process and apparatus for isomerizing light straight chain paraffins and more particularly to a process and apparatus for converting such paraffins to their branched chain isomers in the presence of hydrogen and a supported platinum catalyst.

The conversion of light straight chain paraffins to their branched chain isomers has great importance in the petroleum and chemical industries. It is important in petroleum refining, because branched chain paraffins of the gasoline boiling range have higher octane ratings than their straight chain isomers. The branched chain isomers are also valuable as chemical intermediates. For example, isobutane is used in the alkylation process to produce branched heptanes and octanes, and isopentane is used in the production of isoprene.

In our patent application, Serial No. 508,980, filed May 17, 1955, now U.S. Patent No. 2,831,908, we have described a valuable new method for isomerizing n-paraffins. This method is based on the discovery that the space-time-yield of branched chain isomers is remarkably high when the normal paraffin is contacted with a platinum-alumina catalyst at an elevated temperature and pressure, at a high space velocity of above 5 liquid volumes of hydrocarbon per volume of catalyst per hour and a low concentration of hydrogen such that the mol fraction of hydrocarbon in the hydrocarbon-hydrogen feed mixture is above 0.5, and above 0.75 for superior space-time-yields, but below the hydrocarbon concentration of about 0.9 to 0.95 mol fraction which causes rapid deactivation of the catalyst. We use the term "spaced-time-yield of branched chain isomer" in its usual sense as meaning the volume of isoparaffin produced per hour per volume of catalyst. This is an important characteristic of the process commercially because it indicates the amount of the desired product that can be produced in a reactor of a given size in a particular period of time. The process is also characterized by high efficiency in terms of the ratio of isoparaffin yield to total yield of conversion product.

The present invention provides a further improvement in the hydroisomerization of light paraffins under the conditions of high space velocity and low hydrogen concentration. In accordance with the invention we maintain an optimum hydrogen concentration substantially throughout the isomerization zone and thereby provide conditions throughout the reaction zone conducive to maximum space-time-yield of isoparaffin and conducive to a prolonged catalyst life. The invention also provides apparatus which is particularly adapted to provide the optimum hydrogen concentration throughout the reaction zone.

The process of the invention in general comprises contacting with a platinum-alumina catalyst in a reaction zone a light paraffinic charge stock in admixture with hydrogen in a concentration such that the mol fraction of hydrocarbon is greater than 0.7 but less than the mol fraction corresponding to rapid catalyst aging, at a charge liquid hourly space velocity of at least 5 volumes of hydrocarbon per volume of catalyst per hour, a temperature from 600 to 1000° F. and a pressure from 20 to 2000 pounds per square inch gauge (hereinafter abbreviated as p.s.i.g.) while introducing hydrogen at one or more intermediate points within the reaction zone.

The apparatus of the invention in general comprises a hydroisomerization catalytic reactor, a line for introducing a charge mixture of hydrogen and low octane number light paraffin hydrocarbon at one end of said catalytic reactor, a line for withdrawing hydrogen and isomerization product at the other end of the reactor and at least one line for introducing hydrogen to the catalytic reactor at an intermediate point in said reactor. In a preferred embodiment of the apparatus the catalytic reactor is provided with means for measuring hydrogen concentration at a point between the product outlet line and the intermediate hydrogen inlet line and said hydrogen concentration measuring means is associated with means for controlling the flow rate in said intermediate hydrogen inlet line.

We will describe our invention more fully with reference to the drawings, of which:

We have shown in our patent application Serial No. 508,980, now U.S. Patent No. 2,831,908, that by hydroisomerization over a platinum-alumina catalyst at high space velocity and at low hydrogen concentration we obtain a markedly high space-time-yield of isoparaffin, a high efficiency in terms of the ratio of paraffin isomerization to total conversion and a high total conversion. These values of space-time-yield, efficiency and total conversion reach maxima at very low hydrogen concentrations, that is to say, hydrogen concentrations much lower than are employed in catalytic reforming. For example, in hydroisomerization of normal pentane over a halogen-promoted platinum-alumina catalyst at a temperature of 810° F., pressure of 500 p.s.i.g., and a space velocity of 10 vol./vol./hr., the space-time-yield is at about the maximum obtainable without rapid catalyst deactivation when the hydrogen concentration is about 200 standard cubic feet per barrel of hydrocarbon. This corresponds to a hydrogen mol fraction of about 0.15 or a hydrocarbon mol fraction of about 0.85. Further substantial decrease in hydrogen concentration causes a decrease in the space-time-yield of isoparaffin. Most importantly, however, further decrease in hydrogen concentration causes rapid deactivation of the catalyst and the activity can be restored only by oxidative regeneration. Consequently, while it is desirable to employ a hydrogen concentration corresponding to that which affords the maximum space-time-yield of isoparaffin it is also of the utmost importance to avoid decreasing the hydrogen concentration below that which corresponds to rapid catalyst deactivation.

We have discovered that in the hydroisomerization process hydrogen is consumed in hydrocracking reactions which produce lighter hydrocarbons. This consumption of hydrogen and concomitant, though relatively small, production of lighter hydrocarbons serve to decrease the mol fraction concentration of hydrogen in the reaction zone by an amount that is significant because of the critically small concentration of hydrogen employed in our process.

Figure 1:
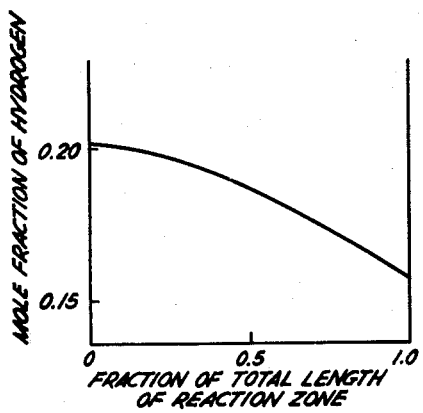
Figure 1 is a plot of hydrogen concentration against the length of the reaction zone in a hypothetical hydroisomerization reaction.

Figure 1 of the drawing illustrates this condition for a hypothetical hydroisomerization run. It shows a decline from a hydrogen concentration at the entrance to the reaction zone of about 0.2 mol fraction to a hydrogen concentration at the outlet end of the reaction zone of about 0.16 mol fraction. The particular value of hydrogen concentration shown for the outlet end of the reaction zone in Figure 1 may or may not be damaging to the catalyst under the reaction conditions being used. However, the plot shows the principle of the declining hydrogen concentration throughout the length of the reaction zone and indicates that in an operation in which the charge mixture at the inlet end is very close to the optimum hydrogen concentration, at the outlet end the hydrogen concentration will more than likely be low enough to cause rapid catalyst deactivation.

One way to avoid the danger of catalyst deactivation in the situation shown in Figure 1 would be to employ an initial hydrogen concentration sufficient to compensate for the drop in hydrogen concentration through the bed so that, despite the drop, the outlet hydrogen concentration would still be in the safe range. However, this would mean that the hydrogen concentration in the inlet portion of the reaction zone would be higher than the concentration that provides maximum space-time-yield of isoparaffin. Consequently, maximum efficiency would not be obtained.

In accordance with our present invention a very high space-time-yield of isomer is obtained by employing an inlet hydrogen concentration lower than would normally be safe, considering the dilution normally encountered, and introducing hydrogen at one or more intermediate points in the reaction zone to compensate for the drop in hydrogen concentration. Consequently, although a very low inlet hydrogen concentration is employed the outlet hydrogen concentration is still in the safe range. Thus, a hydrogen concentration approaching the concentration that provides maximum space-time-yield is maintained throughout the reaction zone without the danger of catalyst deactivation. This result is shown diagrammatically in Figure 2 of the drawing. As the figure shows the mol fraction of hydrogen at the inlet end of the reaction zone is 0.2. The hydrogen concentration decreases along the length of the reaction zone and at an intermediate position additional hydrogen is introduced to raise the hydrogen concentration to the inlet value of 0.2 mol fraction. Thereafter, the hydrogen concentration again declines along the length of the bed but at the outlet end the hydrogen concentration is still above the minimum safe level, in contrast to the situation shown in Figure 1.

As we have said, the hydrogen concentration in the feed to our process is kept at a low level so as to favor high conversion of the straight chain paraffins to their branched chain isomers. As compared with reforming processes which treat naphthenic fractions principally to accomplish aromatization and hydrocracking and which normally use hydrogen concentrations from 5,000 to 20,000 standard cubic feet of hydrogen per barrel of hydrocarbon (corresponding to about 0.15 to 0.04 mol fraction of hydrocarbon), our process uses hydrocarbon-hydrogen ratios from about 0.7 to 0.9 or 0.95 mol fraction of hydrocarbon in the charge. The precise minimum hydrogen concentration or maximum mol fraction hydrocarbon which provides the greatest space-time-yield of isoparaffin while avoiding rapid catalyst deactivation will vary slightly depending upon the paraffin charge stock, the catalyst composition and reaction conditions. In any event, the hydrogen concentration of the reaction stream at the inlet of the reaction zone is kept close to the minimum concentration for avoiding rapid catalyst deactivation and the subsequent decrease in hydrogen concentration within the reaction zone is compensated for by the intermediate introduction of hydrogen within the reaction zone.

The hydrogen employed in our process can be obtained from an impure stream. A stream which produces excellent results consists essentially of about 80 mol percent hydrogen and 20 mol percent $C_1$ to $C_4$ hydrocarbons.

As we have indicated, we obtained high space-time-yields of branched chain paraffins by combining the use of a high space velocity with the use of low hydrogen concentrations and a platinum catalyst. By high space velocity we mean liquid hourly space velocities that are conventionally not considered practicable for satisfactory conversion in naphtha reforming processes, and more particularly, we mean space velocities above 5 liquid volumes of hydrocarbon per volume of catalyst per hour. Preferably, our process uses space velocities above 8 vol./vol./hr. and we can use considerably higher space velocities, for example, as high as 25 vol./vol./hr. or higher and still obtain good conversions.

The catalyst for our process is composed of platinum supported on alumina. The platinum content of the catalyst is from 0.1 to 5.0 percent by weight and preferably is from 0.2 to 1.0 percent by weight. The catalyst preferably contains minor amounts, for example, from 0.1 to 10 percent by weight of combined chlorine and/or fluorine and/or other activating components. The catalyst can be in the form of irregular granules or of particles of uniform size and shape prepared by pilling, extrusion or other suitable methods.

The high space-time-yield of isoparaffin that characterizes the hydroisomerization process carried out at high space velocity and low hydrogen concentration can be obtained at moderate reaction temperatures. Our process operates in the temperature range from 600° F. to 1000° F. The best results, however, are obtained in the range from 650° F. to 900° F. The reaction temperature for any particular run will be selected according to the activity of the catalyst and the total conversion and conversion to isoparaffin desired. Normally, the temperature will be periodically raised in small increments, e.g., increments of 2 or 3° F. to 25° F., as the catalyst activity gradually declines. The reaction pressure can range from 20 to 2000 p.s.i.g., but best results are obtained at a pressure from 50 to 600 p.s.i.g.

We have described the hydroisomerization charge for our process as comprising light paraffin hydrocarbons. The paraffin hydrocarbons for which hydroisomerization over a platinum-alumina catalyst at high space velocity and low hydrogen concentration is particularly adapted are the aliphatic paraffins having no more than 7 carbon atoms. Our process is concerned with isomerizing the low octane number paraffins of this class to their isomers of higher octane rating. This involves isomerizing n-butane, n-pentane, and the low octane number hexanes and heptanes to their branched chain isomers. By "low octane number hexanes and heptanes" we mean n-hexane, n-heptane and the slightly branched hexanes and heptanes such as 2-methylpentane, 3-methylpentane and the methyl hexanes. An essential feature of the charge stock for our hydroisomerization process is that the charge is low in naphthene and aromatics content. More specifically, at least 90 percent of the hydrocarbon charge stock consists of aliphatic hydrocarbons. Thus, a small concentration of naphthenes or aromatics having boiling points close to those of the isomerizable normal paraffins can be tolerated. For example, a hexane fraction charged to our process can contain a total of as much as 10 percent cyclohexane, benzene and methyl cyclopentane. However, a concentration of cyclic hydrocarbons in the hydrocarbon fraction greater than about 10 mol perecnt is deleterious and makes it impossible to obtain the full benefits of long catalyst life and high space-time-yield of isoparaffin when operating at high space velocity and low hydrogen concentration over a platinum-alumina catalyst.

The hydrocarbon charge stock for our process can be a substantially pure fraction of n-butane, n-pentane, n-hexane or n-heptane or it can be a refinery fraction predominating in one of these n-paraffins and containing very little of the others. It can also be a mixture of two or more of these n-paraffins or of fractions predominating therein. Most suitably, the charge stock is a refinery fraction that consists largely of one or more of the mentioned n-paraffins plus minor amounts of other hydrocarbons of similar boiling range that would normally be present in light, straight run petroleum fractions or in n-butane, n-pentane, n-hexane or n-heptane fractions recovered from the product of a conversion process such as catalytic reforming. A fraction which is particularly suitable for our process is a refinery straight run n-pentane fraction which contains 85 volume percent of more n-pentane and smaller amounts of isopentane (e.g., 8 percent) and isohexanes (e.g., 7 percent).

An advantage of our hydroisomerization process is that the charge, although predominantly paraffinic, can also contain a minor amount of aliphatic olefins of boiling range close to that of the paraffinic components. Any loss of hydrogen by saturation of olefins during the hydroisomerization process is made up by the intermediate introduction of hydrogen in the reaction zone and the hydrogen concentration does not drop below the minimum value for avoiding rapid catalyst deactivation. For all of the possible charge stocks for our process the essential feature is that at least 90 percent of the charge consists of low octane number aliphatic hydrocarbons of from 4 to 7 carbon atoms. The charge thus has a low or negligible content of naphthenes and aromatics.

Figure 3:
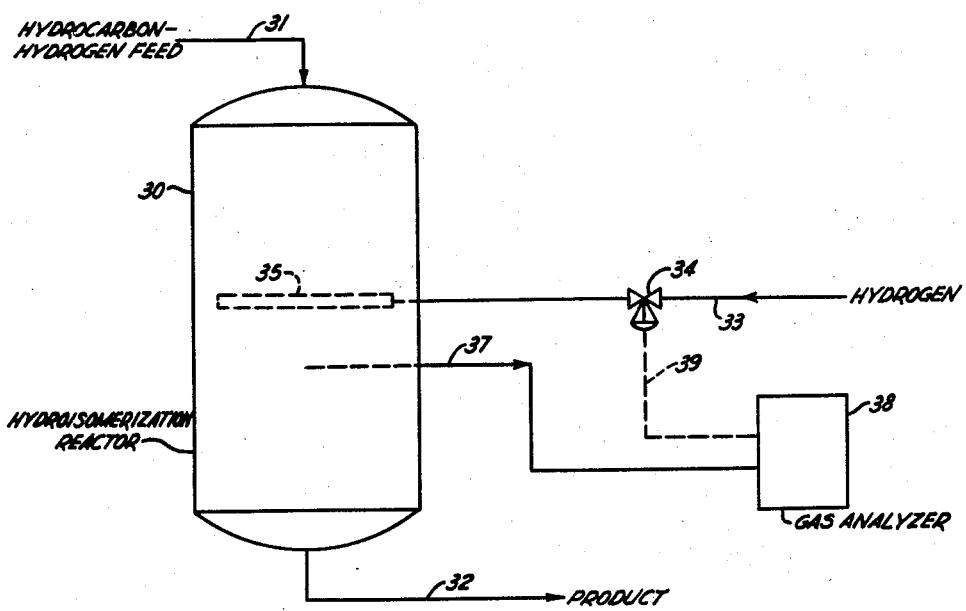
Figure 3 is a highly diagrammatic illustration of one embodiment of our apparatus.

Figure 3 of the drawing shows diagrammatically one form of the apparatus of our invention in which our process can be carried out. The apparatus comprises a catalytic reactor 30 containing a fixed bed of platinum-alumina catalyst. An inlet line 31 is provided for introducing a preheated paraffinic hydrocarbon charge and hydrogen. Line 32 is provided for withdrawing the product stream. At an intermediate point along the length of the catalyst bed the apparatus is provided with a line 33 for introducing hydrogen. This line is provided with a flow control valve 34 and a means, such as the sparger 35, for distributing the hydrogen uniformly across the catalyst bed.

The apparatus of Figure 3 is provided with means for automatic control of the rate of hydrogen introduction at the intermediate point of the catalyst bed. This includes a line 37 for withdrawing a sample of the reaction zone gas stream which is positioned downstream from the distributing means 35 for intermediate introduction of hydrogen. The control means also includes an analyzing means 38 and a means for controlling the hydrogen flow valve 34 in response to indications of the analyzing means 38.

Figure 2:
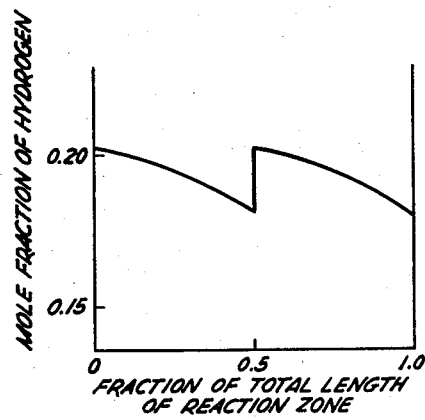
Figure 2 is a similar plot of hydroisomerization process carried out in accordance with our invention.

The charge stream of hydrogen and paraffin is introduced via line 31 and, as shown in Figure 1, the hydrogen concentration decreases as the gas stream flows through the catalyst bed. Hydrogen introduced by distributor 35 at the mid-point of the bed increases the hydrogen concentration as shown in Figure 2 of the drawing. The product stream withdrawn via line 32, although lower in hydrogen concentration than the inlet stream is still above the minimum safe level for hydrogen concentration.

The provision of automatic means for controlling the intermediate introduction of hydrogen has important advantages. For example, as we have said, the reaction zone temperature may be raised periodically during a hydroisomerization run as the activity of the catalyst decreases gradually. Various other conditions influencing the safe hydrogen concentration may also change. For example, the amount of hydrocracking or the total conversion may decline. Therefore, it is advantageous to provide the means shown in Figure 3 for automatically adjusting the rate of introduction of hydrogen at intermediate points in the reaction zone. We accomplish this automatic adjustment by continuous or intermittent analysis of a sample of the reaction zone gas. Our process and apparatus are not limited to the use of any particular type of analyzing means. Various instruments for measuring gas compositions in industrial processes and for actuating valve control devices in response to the analyses may be used. These include an infrared analyzer, a thermal conductivity cell, a gas density balance, etc. The main requirement for the analyzing means is that it be capable of analyzing the gas sample reasonably accurately and rapidly enough to correct unbalance of the system with a minimum of time lag. In the preferred embodiment of our apparatus the analyzing means operates the hydrogen flow control valve in line 33 in response to changes in the composition of the gas sample. Valve 34 in line 33 can be an automatically controllable valve such as a pneumatic diaphragm motor operated valve or an electric motor operated valve or the like. Advantageously, as shown in the drawing, valve 34 is a diaphragm valve which is operated pneumatically by analyzer 38 through the air line 39.

The direct method of control for the apparatus of Figure 3 is measurement of the hydrogen concentration of the reaction zone gas. However, other analytical controls are possible. For example, as disclosed in our patent application with Charles W. Montgomery, Serial No. 583,497, filed May 8, 1956, in the hydroisomerization of a charge stock that consists substantially entirely of paraffins the olefin content of the product can provide an indication of the proper hydrogen concentration of the charge. Therefore, the analyzing means 38 can be set to increase or decrease the hydrogen flow rate through line 33 in response to changes in the olefin concentration of the reaction zone gas.

For simplicity in the drawing we have shown an apparatus with only one intermediate means for introducing hydrogen. It should be understood, however, that a plurality of such means for introducing hydrogen at intermediate points in the reaction zone can be employed. The number and the spacing of the hydrogen distribution elements and the lines for withdrawing gas samples can be selected to provide the desired degree of constancy of hydrogen concentration throughout the reaction zone. A single analyzer can be employed to control a number of sampling points and hydrogen flow control valves by suitable arrangement of valves and switching devices.

A typical operation of our process is described in the following example.

*Example*

The hydrocarbon charge comprises a refinery normal pentane fraction consisting of about 90 mol percent n-pentane, 7 percent isopentane, 1 percent cyclopentane and 2 percent dimethylbutanes. The hydrocarbon charge is preheated to reaction temperature in admixture with hydrogen in a concentration such that the charge mixture comprises 0.7 mol fraction hydrocarbon and 0.3 mol fraction hydrogen. The preheated hydrocarbon-hydrogen mixture is charged to the catalytic reactor containing a fixed bed of pelleted platinum-alumina catalyst containing 0.38 weight percent platinum, 0.65 weight percent halogen (Cl and F) and the balance essentially alumina. The reaction conditions include an average reactor temperature of 830° F., a pressure of 500 p.s.i.g. and a space velocity of 8.4 vol./vol./hr. An impure hydrogen recycle stream containing 85 percent hydrogen is recycled at a rate of 590 s.c.f./bbl. Hydrogen recycle is also introduced through a distributor at the mid-point of the catalyst bed at a rate controlled by thermal conductivity analysis of reaction gas samples withdrawn between the midpoint and the outlet end of the bed. Sufficient hydrogen is introduced at the mid-point to prevent the hydrogen concentration within the reaction zone falling below 0.13 mol fraction. A reaction product is recovered, which after separation of hydrogen and light gases, contains at least 40 weight percent of isopentane based on the total liquid product.

Obviously many modifications and variations of the invention as hereinbefore set forth may be made without departing from the spirit and scope thereof and therefore only such limitations should be imposed as are indicated in the appended claims.

We claim:

1. In the hydrosiomerization process which comprises contacting with a platinum-alumina catalyst a paraffinic hydrocarbon fraction of which at least 90 percent consists of aliphatic hydrocarbons, the isomerizable paraffins thereof consisting essentially of paraffins having no more than 7 carbon atoms, at a temperature from 600 to 1000° F., at super-atmospheric pressure, at a liquid hourly space velocity of at least 5 volumes of hydrocarbon per volume of catalyst per hour and in admixture with hydrogen in a concentration less than the hydrogen concentration corresponding to a mol fraction of hydrocarbon of 0.7 but greater than the hydrogen concentration corresponding to rapid catalyst deactivation, the improvement which comprises introducing hydrogen to the reaction zone between the inlet and outlet ends thereof at a rate sufficient to prevent rapid catalyst deactivation but insufficient to produce a hydrogen concentration in any portion of the reaction zone greater than the concentration of hydrogen introduced in admixture with said paraffinic hydrocarbon fraction.

2. A process in accordance with claim 1 in which the hydrogen concentration of the charge mixture is so low that the decrease in hydrogen concentration within the reaction zone would, in the absence of the introduction of hydrogen between the inlet and outlet ends of the reaction zone, result in a hydrogen concentration of the reaction zone gas at the outlet end of the reaction zone below the hydrogen concentration corresponding to rapid catalyst deactivation.

3. In the hydroisomerization process which comprises contacting with a platinum-alumina catalyst a paraffinic hydrocarbon fraction of which at least 90 percent consists of aliphatic hydrocarbons, the isomerizable paraffins thereof consisting essentially of paraffins having no more than 7 carbon atoms, at a temperature from 600 to 1000° F., at superatmospheric pressure, at a liquid hourly space velocity of at least 5 volumes of hydrocarbon per volume of catalyst per hour and in admixture with hydrogen in a concentration less than the hydrogen concentration corresponding to a mol fraction of hydrocarbon of 0.7 but greater than the hydrogen concentration corresponding to rapid catalyst deactivation, the improvement which comprises introducing hydrogen to an intermediate region of the reaction zone between the inlet and outlet ends thereof, withdrawing a sample of the reaction zone gas from an intermediate region of the reaction zone between said region of hydrogen introduction and the outlet end of the reaction zone, analyzing said gas sample, in response to said analysis controlling the rate of introduction of hydrogen at said intermediate region of the reaction zone, the rate of introduction of hydrogen in said intermediate region being sufficient to prevent rapid catalyst deactivation but insufficient to produce a hydrogen concentration in any portion of the reaction zone greater than the concentration of hydrogen introduced in admixture with said paraffinic hydrocarbon fraction.

4. Apparatus for hydroisomerization comprising a catalytic reactor containing a fixed bed of supported platinum catalyst, a line at the inlet end of said reactor for introducing a charge mixture of paraffinic hydrocarbons and hydrogen, a line at the outlet end of said reactor for withdrawing a product stream, a line for introducing hydrogen between the inlet and outlet ends of said reactor, said line being connected with a hydrogen distributing means disposed in an intermediate region of said reactor, said line having a flow control valve, a line between said means for introducing hydrogen and said outlet end of the reactor for withdrawing gas samples, a gas analyzing means connected with said line for withdrawing gas samples, said analyzing means being also operatively connected with said flow control valve in said hydrogen introduction line for controlling said valve in response to changes in the composition of said gas samples.

References Cited in the file of this patent

UNITED STATES PATENTS

| | | |
|---|---|---|
| 2,303,118 | Frey | Nov. 24, 1942 |
| 2,330,069 | Marshall | Sept. 21, 1943 |